Dec. 20, 1949     G. A. LYON     2,491,506
WHEEL COVER
Filed May 12, 1945     2 Sheets-Sheet 1
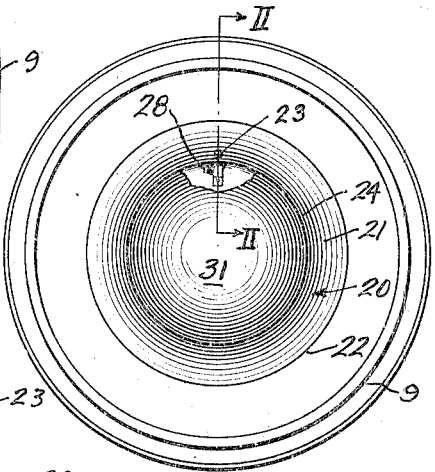
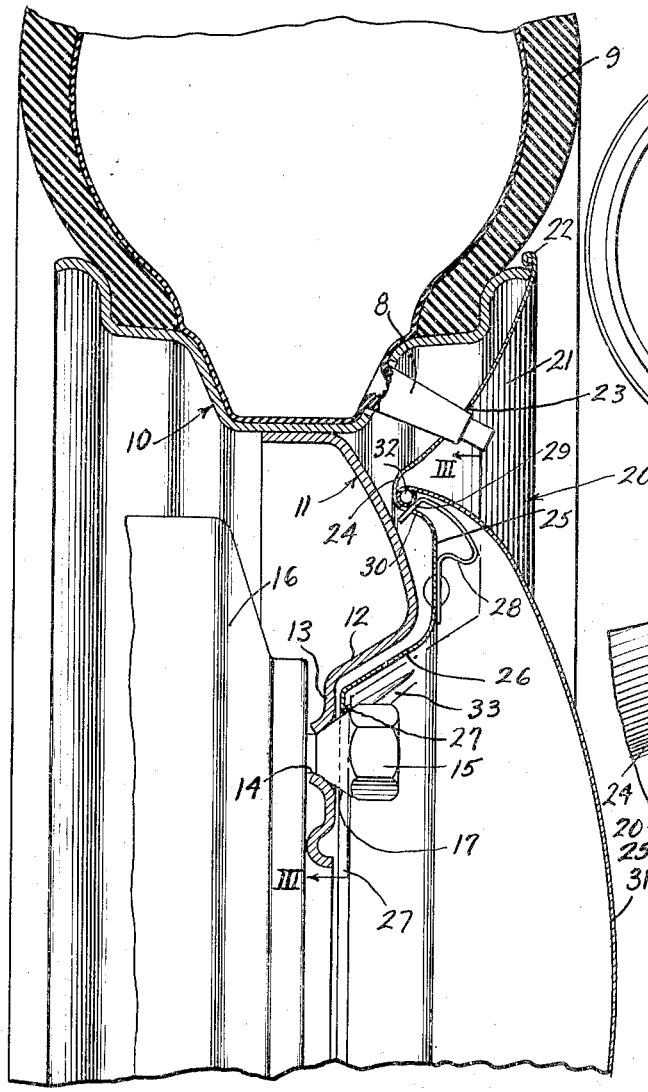
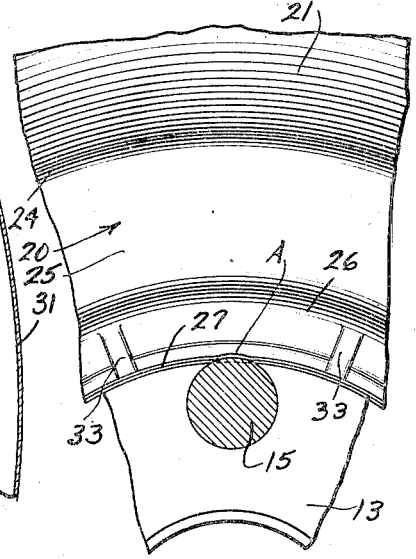
Inventor
GEORGE ALBERT LYON
by The Firm of Charles W. Hills Attys.

Dec. 20, 1949 G. A. LYON 2,491,506
WHEEL COVER
Filed May 12, 1945 2 Sheets-Sheet 2
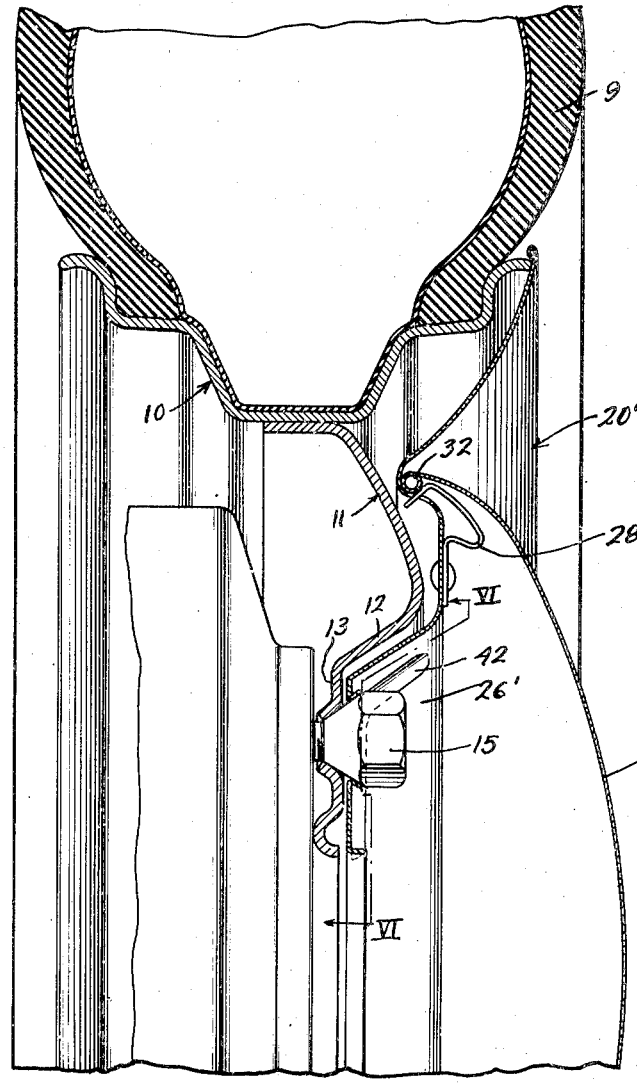
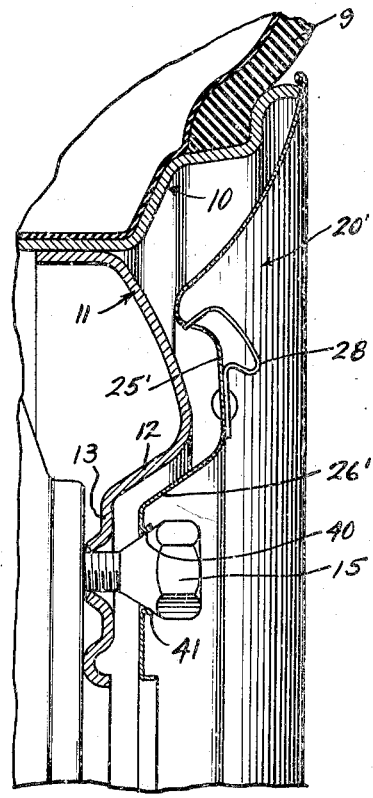
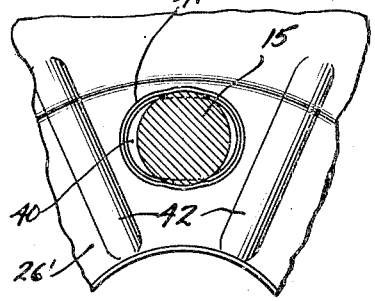
Inventor
GEORGE ALBERT LYON
by The Firm of Charles W Hill Attys.

Patented Dec. 20, 1949

2,491,506

UNITED STATES PATENT OFFICE 2,491,506

WHEEL COVER

George Albert Lyon, Allenhurst, N. J.

Application May 12, 1945, Serial No. 593,469

15 Claims. (Cl. 301—37)

This invention relates to a wheel structure and more particularly to a novel cover for an automobile type of wheel which embodies the usual tire rim and body or load bearing part.

An object of this invention is to provide an improved sheet metal cover for an automobile which may be effectively held under tension in cooperation with the wheel and which may be made of relatively thin sheet metal material.

Another object of this invention is to provide a thin metallic cover which is so constructed as to cooperate with the cap screws used to bolt a wheel on a brake drum whereby such cap screws may be employed to deflect and tension the cover.

In accordance with the general features of this invention there is provided in a cover structure for a wheel including a tire rim and a body part having a central flange provided with attachment screws, a cover therefor of light sheet metal including an outer portion for bearing against the tire rim, a central portion constructed for engagement by the heads of the screws to deflect said central portion under tension toward the central flange and retain the cover in tight engagement with the tire rim, and an intermediate bellows or diaphragm-like portion connecting the outer and central portions together and providing the cover with resilient yieldable characteristics whereby the cover may readily accommodate manufacturing variations in the parts of the wheel.

Another feature relates to the utilization of the intermediate diaphragm section of the aforesaid cover to serve as a mounting for hub cap retaining means such as spring clips or the like.

Other objects and features of this invention will more fully appear from the following detailed description taken in connection with the accompanying drawings which illustrate several embodiments thereof and in which Figure 1 is a side view of a wheel assembly having my novel cover applied thereto and with a portion of the hub cap broken away to show one of the hub cap retaining spring clips;

Figure 2 is an enlarged fragmentary cross sectional view taken on the line II—II of Figure 1 looking in the direction indicated by the arrows;

Figure 3 is a fragmentary sectional view taken on the line III—III of Figure 2 looking in the direction indicated by the arrows and showing the manner in which each of the cap screws cooperate with an edge portion of the metallic cover.

Figure 4 is a fragmentary sectional view similar to Figure 2 illustrating a modification of the invention;

Figure 5 is a fragmentary sectional view corresponding to Figure 4, but illustrating the condition of the cover prior to the application of the cap screws in tensioned engagement therewith and with the hub cap omitted; and Figure 6 is a fragmentary sectional view taken on the line VI—VI of Figure 4 looking in the direction indicated by the arrows and showing the manner in which each of the cap screws cooperate with an edge of an opening in the central portion of a wheel cover.

As shown on the drawings:

The reference character 9 designates generally a conventional type of pneumatic tube and tire having the usual valve stem 8 which is of a construction now well known in the art.

This tire 9 is carried by a conventional multi flange drop center type of tire rim designated generally by the reference character 10. This tire rim may comprise a rolled section such as is now commonly used in the automotive field.

The tire rim 10 is carried upon a central body or load bearing part 11 which comprises a shell-like metallic stamping. This stamping 11 includes a bulged central dished portion 12, terminating in a radially extending bolt on flange 13 having a plurality of apertures 14 for accommodating the conventional cap screws 15 threaded into the usual brake drum 16.

My present invention is principally concerned with the provision of a novel sheet metal cover for a wheel of the aforementioned type and which cover may be economically manufactured on a large production basis and yet, in use, be able to accommodate slight manufacturing variation in the relative location of the rim and body parts of the wheel.

I have designated the first form of cover generally by the reference character 20 and it will be perceived from Figure 2 that this cover extends clear from its outer turned edge 22 to the center of the wheel. The outer turned edge 22 of the cover is adapted to slightly overhang the outer edge of the rim part adjacent the outer side wall of the tire.

The cover includes an outer annular portion 21 which extends generally radially and axially inwardly from the edge 22 toward the body part 11 so that in use this portion will appear to constitute a continuation of the curved outer side wall of the tire. This appearance may be accentuated by giving the portion 21 a white external finish which will cause this portion in use to appear to be a white side wall part of the tire.

Also it is contemplated that the portion 21 will be provided with an aperture 23 through which the valve stem 8 can project to enable access to the same. By reason of the fact that the portion 21 extends radially and axially inwardly it is closer to the rim than would otherwise be the case, and as a consequence, a relatively short valve stem can be employed in this assembly.

The inner margin of the portion 21 terminates in an annular depression 24 which in turn is connected to an intermediate substantially flattened section 25, which, in action, resembles a diaphragm or a bellows. That is to say, this flattened section 25 by reason of its raised characteristics as well as its location can resiliently yield in much the same manner as a bellows or a diaphragm.

The inner margin of the diaphragm section 25 terminates in an inwardly dished central cover portion 26 which overlies the portion 12 of the body part as well as partially overlies the bolt-on flange 13. This portion 26 terminates in an inclined edge 27 with such inclination as to cooperate with the inclined sides of the screws 15.

In addition, the diaphragm section 25 has mounted on it a plurality of hub cap retaining spring clips 28 which may be of any suitable number, such for example, as three to five. Each of these clips 28 has a turned outer free extremity 29 which projects into an aperture 30 in the diaphragm section 25. These spring clips are commonly referred to in the art as an inverted type of clip. That is to say, they permit of an easy-on action in the mounting of the hub cap thereon but necessitates the use of a much greater force to pry the hub cap free from the clip. This "easy-on hard-off" action is very desirable since it minimizes the likelihood of the hub cap being accidently jarred free of the wheel. The hub cap is designated generally by the reference character 31 and it, like the cover, may be made from relatively thin sheet metal. In reality it comprises a component part of the cover assembly. This hub cap 31 in addition to its usual central crown portion has an inwardly turned edge 32 adapted to be cammed over the extremities 29 into retained cooperation therewith and into tight engagement with the grooved portion 24 of the cover proper.

In the application of the cover to the wheel, the cover 20 is first aligned with the wheel with the aperture 23 fitted over the valve stem 8. When in this position the portion 26 is spaced a substantial distance from the body part portion 12. Thereafter the cap screws 15 are threaded into the openings in the brake drum 16. As these cap screws are threaded progressively into their holes, they engage the edge 27 of the cover to deflect the cover toward the portion 12. This deflection of the cover portion 26 is enabled by reason of the flexible characteristics of the diaphragm or bellows-like section 25. In other words, both of the portions 21 and 26 of the cover are relatively rigid portions as compared to the diaphragm section 25 which provides the cover with the requisite resiliency necessary to insure a tight fit of the cover on the wheel.

This is a very important feature of the invention since it is well known in the manufacture of wheel parts such as the rim and body part that when they are assembled together they may vary in position relative to each other. In fact considerable manufacturing tolerance is allowed in this respect. Hence, if a cover is to properly and tightly engage a wheel it is necessary that the cover be capable of accommodating this variation. I provide for this feature by the forming of the diaphragm section 25 in the cover so that the central portion of the cover can be deflected toward the wheel to bring the outer edge 22 into tight engagement with the outer edge of the rim part of the wheel.

I prefer to space the grooved intermediate portion 24 slightly from the body part 11 although in some cases if it is so desired this portion 24 may bear against the body part. It will be perceived from Figure 2 that by reason of the bulged configuration of the flattened section 25 the rivets holding the spring clips 28 in position do not come into contact with the body part.

In addition by reason of the particular shape of the grooved section 24, it is possible to provide a pry off zone in which the end of a pry-off instrument or screw driver may be inserted for the purpose of prying the hub cap 31 free of its retaining engagement with the spring clips 28. Thus the hub cap may be readily applied or secured to the wheel independently of the attachment of the cover to the wheel. Upon removal of the hub cap 31 access may be had to the wheel bolts for enabling removal of these bolts.

The inner inclined edge 27 of the cover 20 acts to stiffen the cover at its point of engagement by the cap screws 15. If it is so desired, the central portion 26 may be provided with additional stiffening ribs 33—33 on opposite sides of each cap screw.

Attention is directed to Figure 3 wherein it will be perceived that the head of the cap screw 15 is adapted to lap the inclined edge 27 of the cover 20 for the purpose of deflecting the portion 26 toward the wheel. I find that this is much more desirable than having the edge of a hole in the cover deflected into the hole 14 in the bolt-on flange 13 of the wheel body part. The reason for this is that if too much stress is placed upon the metal of the cover, it will tend to permanently take a set in the wheel openings and as a consequence the cover will lose some of its elasticity.

In Figures 4 to 6 inclusive I have illustrated a slight modification of the invention wherein the wheel is identical to the wheel of the first one and wherein the cover 20' is identical to the cover 20 with the exception of the central portion 26'. The hub cap 31 in this form is identical to the hub cap of the first form and has an outer turned edge 32 for cooperation with the spring clips 28 carried by the cover 20'.

The central portion of the cover 20' has instead of a single edge portion for cooperation with the cap screws 15 a plurality of holes 40 one for each cap screw. Each of these holes is defined by an inclined or tapered edge 41 which is of the same inclination as the corresponding tapered portion of the head of the cap screws. In other words each of these inclined portions 41 defines a seat for a portion of the cap screw engaged thereby.

The holes 40 may be slightly oval in configuration so as to necessitate a tight fit of the cap screws 15 therein.

In addition the portion 26' of the cover may be provided with a plurality of ribs 42 on opposite sides of each bolt hole 40 for reinforcing the cover.

In Figure 5 I have illustrated the condition of the cover prior to the tightening of it in position and prior to the application of the hub cap thereto. It will be perceived from a comparison of Figure 5 with Figure 4 that prior to the tightening of the cap screws 15 the portion 26' is spaced a considerable distance from the body part of the wheel. Thereafter as the cap screws are tightened, the portion 26' is bodily moved or deflected toward the body part by reason of the flexing of the intermediate or diaphragm section 25' of the cover. After the cover has been tightened in place so that its outer edge is in tight engagement with the rim part 10 of the wheel, the hub cap may be snapped over the spring clips in the manner previously described.

It should be noted that while I have disclosed the spring clips as being the retaining means for the hub cap, any conventional hub cap retaining means such as is now used in the automobile trade may be substituted for the spring clips 28 if it is so desired.

Both forms of the invention operate in substantially the same manner and function to accommodate manufacturing tolerances in the wheel parts. In addition both forms of cover are adapted for a tight fit on the wheel and are maintained in this condition by reason of the deflection of the central section of the cover under tension.

I claim as my invention:

1. In a cover structure for a wheel including a tire rim and a body part having a central flange provided with attachment screws, a cover therefor of light sheet metal including an outer portion for bearing against the tire rim and a central portion with an edge for engagement by the heads of said screws to deflect said central portion under tension toward said central flange and retain said cover in tight engagement with said tire rim, said central portion being joined to said outer portion by a deflectable annular diaphragm section.

2. In a cover structure for a wheel including a tire rim and a body part having a central flange provided with attachment screws, a cover therefor of light sheet metal including an outer portion for bearing against the tire rim and a central portion with an edge for engagement by the heads of said screws to deflect said central portion under tension toward said central flange and retain said cover in tight engagement with said tire rim, said central portion being joined to said outer portion by a deflectable annular diaphragm section, and said diaphragm section carrying hub cap retaining means and a hub cap snapped over and into retained engagement with said retaining means.

3. In a cover structure for a wheel including a tire rim and a body part having a central flange provided with attachment screws, a cover therefor of light sheet metal including an outer portion for bearing against the tire rim and a central portion with an edge for engagement by the heads of said screws to deflect said central portion under tension toward said central flange and retain said cover in tight engagement with said tire rim, said central portion being joined to said outer portion by a deflectable annular diaphragm section, and said diaphragm section comprising an axially outwardly extending flattened portion on which hub cap retaining spring clips are mounted.

4. In a cover structure for a wheel including a tire rim and a body part having a central flange provided with attachment screws, a cover therefor of light sheet metal including an outer portion for bearing against the tire rim and a central portion with an edge for engagement by the heads of said screws to deflect said central portion under tension toward said central flange and retain said cover in tight engagement with said tire rim, said central portion being joined to said outer portion by a deflectable annular diaphragm section, and said outer portion extending radially and axially inwardly to said diaphragm section so as to substantially conceal the exposed outer side flanges of the rim part and so as to in use appear to be a continuation of the curved outer side wall of the tire.

5. In a cover structure for a wheel including a multi-flange tire rim and a body part having a central flange provided with attachment screws, a cover therefor of light sheet metal including an outer annular portion for bearing against the tire rim and extending generally axially and radially inwardly towards the body part, a central portion opposite said flange and provided with a plurality of apertures each having an inclined edge for engagement by an inclined surface of the head of one of the attachment screws and an intermediate annular diaphragm section connecting said outer and central portions and yieldable upon pressure being exerted by the screws against said central portion whereby the cover may be retained under tension and in tight engagement with said tire rim.

6. In a cover structure for a wheel including a multi-flange tire rim and a body part having a central flange provided with attachment screws, a cover therefor of light sheet metal including an outer annular portion for bearing against the tire rim and extending generally axially and radially inwardly towards the body part, a central portion opposite said flange and provided with a plurality of apertures each having an inclined edge for engagement by an inclined surface of the head of one of the attachment screws and an intermediate annular diaphragm section connecting said outer and central portions and yieldable upon pressure being exerted by the screws against said central portion whereby the cover may be retained under tension and in tight engagement with said tire rim, said diaphragm section being provided with hub cap retaining means over which a detachable hub cap is snapped into retaining engagement therewith.

7. In a cover structure for a wheel including a tire rim and a body part having a central flange provided with attachment screws, a cover therefor of light sheet metal including an outer portion for bearing against the tire rim and a central portion for engagement by the heads of said screws to deflect said central portion under tension toward said central flange and retain said cover in tight engagement with said tire rim, said central portion being joined to said outer portion by a deflectable annular diaphragm section, there being an annular groove between said diaphragm section and said outer portion and opening outwardly for receiving the edge of a hub cap in assembly with the cover structure, and means on the cover for retaining the hub cap.

8. In a cover structure for a wheel including a tire rim and a body part having a central flange provided with attachment screws, a cover therefor of light sheet metal including an outer portion for bearing against the tire rim and a central portion for engagement by the heads of said screws to deflect said central portion under tension toward said central flange and retain said cover in tight engagement with said tire rim, said central portion being joined to said outer portion by a deflectable annular diaphragm section, there being an annular outwardly opening groove between said diaphragm section and said outer portion, a hub cap having an edge receivable in said groove, and means carried by said diaphragm section, a hub cap having an edge receivable in said said groove.

9. In a cover structure for a wheel including a tire rim and a body part having a central flange provided with attachment screws, a cover therefor of light sheet metal including an outer portion for bearing against the tire rim and a central portion for engagement by the heads of said screws to deflect said central portion under tension toward said central flange and retain said cover in tight engagement with said tire rim, said central portion being joined to said outer portion by a deflectable annular diaphragm section, there being an annular outwardly opening groove between said diaphragm section and said outer portion, a hub cap having an edge receivable in said groove, and means carried by said diaphragm section for securing the hub cap in assembly within said groove, said diaphragm section having apertures adjacent to said groove for passage of a portion of said retaining means.

10. In a cover structure for a wheel including a tire rim and a body part having a central flange provided with attachment screws having conical-like clamping head shoulders, a cover therefor of light sheet metal including an outer portion for bearing against the tire rim and a central portion with an edge extending generally inwardly into proximity to the radially outer sides of the screws for engagement by the conical-like shoulders of the heads of the screws to deflect said central portion under tension toward said central flange and retain said cover in tight engagement with said tire rim, the edge of said central portion having a turned reinforcing flange located on a diameter equal to a diameter circumscribing the radially outer sides of the clamp head shoulders of the screws so that in the fully tightened condition of the screws said edge is merely lapped by said screw head shoulders.

11. In a cover structure for a wheel including a tire rim and a body part having a central flange provided with attachment screws having conical-like clamping head shoulders, a cover therefor of light sheet metal including an outer portion for bearing against the tire rim and a central portion with an edge for engagement by the conical-like shoulders of the screw heads to deflect said central portion under tension toward said central flange and retain said cover in tight engagement with said tire rim, said edge portion being inclined in a generally axially and radially outward direction to afford a seat for an inclined surface of each of said screw heads and extending into proximity to the radially outer sides of the screws.

12. In a cover structure for a wheel including a tire rim and a body part having a central flange provided with attachment screws having conical-like clamping head shoulders, a cover therefor of light sheet metal including an outer portion for bearing against the tire rim and a central portion with an edge extending into proximity to the radially outer sides of the screws for engagement by the conical-like shoulders to deflect said central portion under tension toward said central flange and retain said cover in tight engagement with said tire rim, said central portion being ribbed at circumferentially spaced points on opposite sides of the points of lapping engagement by the respective screws to strengthen said portion at its points of attachment.

13. In a cover structure of the character described for disposition on the outer side of a vehicle wheel in covering relation to the tire rim and adjacent portion of the load sustaining body part of the wheel, a cover annulus including a radially inner portion arranged to be engaged by the attachment screws of the wheel and providing edge areas engageable by the tapering shoulders of the screws, said areas being formed with generally axially outwardly extending flange portions generally complementary to the screw head taper whereby a lapping engagement between said flange portions and the screw heads is adapted to be effected and the inner portion of the cover may remain out of engagement with the wheel body while only the outer portion of the cover engages the wheel.

14. In a wheel structure including a tire rim and a load sustaining body portion wherein the body portion has a depressed bolt-on flange, screw members for securing the bolt-on flange to a vehicle and having tapered attachment heads, an annular cover member engaging the tire rim at its outer margin and having a radially inner marginal portion formed for engagement by the tapered heads of the screw members in lapping relation and held thereby to maintain the cover under tensioned engagement against the tire rim, the remainder of the cover radially inwardly from said outer margin and including the radially inner screw member engaging portion of the cover being in spaced relation to the wheel.

15. In a cover for disposition at the outer side of a vehicle wheel, a radially outer annular portion, a radially inner annular portion, a diaphragm portion connecting the radially inner and outer portions and having respective angular junctures therewith, said diaphragm portion having hub cap retaining spring clips mounted thereon and having the operative portions thereof extending generally radially outwardly, and a hub cap retained on the cover by said spring clips.

GEORGE ALBERT LYON.

REFERENCES CITED

The following references are of record in the file of this patent:

UNITED STATES PATENTS

| Number | Name | Date |
| --- | --- | --- |
| 2,106,586 | Zerk | Jan. 25, 1938 |
| 2,166,216 | Lyon | July 18, 1939 |
| 2,368,232 | Aske | Jan. 30, 1945 |
| 2,368,240 | Lyon | Jan. 30, 1945 |

FOREIGN PATENTS

| Number | Country | Date |
| --- | --- | --- |
| 263,882 | Great Britain | Apr. 21, 1927 |